US012786242B2

(12) United States Patent
Voskamp et al.

(10) Patent No.: US 12,786,242 B2
(45) Date of Patent: *Nov. 3, 2026

(54) MULTI TENANCY FOR SINGLE TENANCY APPLICATIONS

(71) Applicant: MICROSOFT TECHNOLOGY LICENSING, LLC, Redmond, WA (US)

(72) Inventors: Irene Voskamp, Friday Harbor, WA (US); Michiel Van Otegem, Wormer (NL); Doreen Lynn Galli, Henderson, NV (US); Adrian Vincenzo Diglio, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 65 days.

This patent is subject to a terminal disclaimer.

(21) Appl. No.: 18/959,587

(22) Filed: Nov. 25, 2024

(65) Prior Publication Data

US 2025/0088543 A1 Mar. 13, 2025

Related U.S. Application Data

(63) Continuation of application No. 17/983,820, filed on Nov. 9, 2022, now Pat. No. 12,192,242.

(51) Int. Cl.

*H04L 9/40* (2022.01)
*G06F 21/62* (2013.01)
*G06F 21/64* (2013.01)

(52) U.S. Cl.

CPC .......... *H04L 63/20* (2013.01); *G06F 21/6227* (2013.01); *G06F 21/645* (2013.01)

(58) Field of Classification Search

None

See application file for complete search history.

(56) References Cited

U.S. PATENT DOCUMENTS

2023/0351219 A1* 11/2023 Ackerman .......... G06F 21/6227

OTHER PUBLICATIONS

"DCasv5 and ECasv5 series confidential VMs", Retrieved From: https://learn.microsoft.com/en-us/azure/confidential-computing/confidential-vm-overview, Aug. 24, 2022, 4 Pages.

"Microsoft Azure Attestation," Retrieved From: https://azure.microsoft.com/en-us/products/azure-attestation/#overview, 9 Pages.

"Protect derived domain credentials with Windows Defender Credential Guard", Retrieved From: https://learn.microsoft.com/en-us/windows/security/identity-protection/credential-guard/credential-guard, Aug. 12, 2022, 2 Pages.

(Continued)

*Primary Examiner* — Cai Y Chen

(74) *Attorney, Agent, or Firm* — Workman Nydegger

(57) ABSTRACT

Systems generate and utilize ledger records of verifiable evidence that attest to the authenticity and integrity attributes of hardware and software components of a particular computing environment. The ledger record can be sealed to provide a level of assurance that the attestations and evidence in the ledger record have not been tampered with. The ledger record can be shared with different systems and referenced to assess a level of trust and compliance of a computing environment relative to a particular policy context. Subsequent endorsements and controls can also be based on the assessed trust and compliance derived from the ledger records.

20 Claims, 7 Drawing Sheets

(56) References Cited

OTHER PUBLICATIONS

"Push and pull supply chain artifacts using Azure Registry (Preview)", Retrieved From: https://learn.microsoft.com/en-us/azure/container-registry/container-registry-oras-artifacts, Oct. 12, 2022, 11 pages.
"Secure boot", Retrieved From: https://learn.microsoft.com/en-us/windows-hardware/design/device-experiences/oem-secure-boot, May 17, 2022, 3 Pages.
"Trusted Platform Module attestation", Retrieved From: https://docs.microsoft.com/en-us/azure/attestation/tpm-attestation-concepts, Jun. 10, 2022, 5 Pages.
"Trusted Platform Module Technology Overview", Retrieved From: https://learn.microsoft.com/en-us/windows/security/information-protection/tpm/trusted-platform-module-overview, Oct. 14, 2022, 4 Pages.
"What is confidential computing?", Retrieved From: https://learn.microsoft.com/en-us/azure/confidential-computing/overview, Aug. 23, 2022, 2 Pages.
"Windows 10 Device Guard and Credential Guard Demystified", Retrieved From: https://learn.microsoft.com/en-us/archive/blogs/ash/windows-10-device-guard-and-credential-guard-demystified, Mar. 2, 2016, 13 Pages.
International preliminary report on patentability Received in European Patent Application No. PCT/US23/036071 (MS#412222-PCT01), mailed on May 22, 2025, 09 pages.
Joshi, "Virtualization Based Security (VBS) and Hypervisor Enforced Code Integrity (HVCI) for Olympia Users!", Retrieved From: https://techcommunity.microsoft.com/t5/windows-insider-program/virtualization-based-security-vbs-and-hypervisor-enforced-code/m-p/240571, Oct. 24, 2022, 5 Pages.

* cited by examiner

MULTI TENANCY FOR SINGLE TENANCY APPLICATIONS

CROSS REFERENCE

This application is a continuation of U.S. patent application Ser. No. 17/983,820, filed on Nov. 9, 2022, the entire contents of which are incorporated herein by reference.

BACKGROUND

There is an ongoing need and desire to provide secure and trusted computing environments, particularly in view of the development and deployment of increasingly complex software applications and hardware components and infrastructures. This is true for both individual users, as well as for large distributed enterprises and government entities.

Unfortunately, the complexities and variable permutations of current systems makes it difficult to assess the security and conformity of different computing environments, particularly in an efficient and intuitive way.

For at least these reasons, there is an ongoing need and desire for improved systems and techniques for providing end-to-end software integrity and for enabling entities to manage the compliance of different computing environments according to different security policies.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

Systems and methods are provided for facilitating the management of evidence records that can be used to verify device authenticity and integrity and overall computing environment policy compliance. For instance, some systems are configured to generate and utilize evidence ledger records for facilitating the analysis and attestation of different computing components and for assessing overall compliance of different computing environments for different contexts and policies.

When building an evidence ledger, disclosed systems first identify or select the hardware and software components to generate a ledger for. This selection may be based on a current or anticipated deployment and utilization of a particular computing environment. Then, for each selected component, the systems identify whether there is any electronic record of evidence that can be used to verify or attest to a level of confidence that the corresponding component is authentic and/or verified, and that may be included in the ledger of evidence. The identified electronic records of evidence are then added into the ledger and the ledger is sealed with a strong identifier that can be used to verify that contents of the ledger have not been modified.

When adding electronic evidence records to the ledger, the system may add the evidence in different formats in which the logs, certificates, attestations and other evidence is created. In some instances, the processes of adding evidence to the ledger includes adding images or normalized copies of evidence records to the ledger.

In some instances, the evidence is added as links to remotely stored electronic records of evidence. These links may be added along with any strong identifiers (e.g., hashes or security keys), if any, of the electronic records to facilitate their access and verification (e.g., to verify they have not been modified from the time in which the evidence record was created).

Once a general evidence ledger is created, it can be memorialized as a verifiable ledger index record that identifies the selected hardware and software components of the computing environment for particular contexts (e.g., particular times, geographies, or other locations, uses, users, etc.), along with corresponding attestations, verifications and/or other evidence that is usable to verify a level of authenticity and integrity of the different components.

Some systems are also configured to generate endorsement record that reflect determined levels of confidence in the evidence of the components (that they are verified and/or authentic). This level of confidence corresponds to continued and/or anticipated use of the different components and their computing environments in particular policy contexts (e.g., at a particular time, at a particular location, with a particular user, in a particular configuration, etc.). In this regard, the referenced level of confidence can also be interpreted as a level of trust or conformity of a computing system within a particular policy context. Accordingly, the term level of confidence can also be used interchangeably, herein, with the terms level of trust, level of conformity and level of trust and/or conformity.

In some embodiments, the disclosed systems are configured to identify a request to generate an endorsement record corresponding to an identified use of the computing environment in a particular policy context. Then, in response, the systems identify the relevant ledger index record(s) associated with the identified use of the computing environment in the particular policy context. Next, the systems verify that the ledger records have not been modified, based on the corresponding strong identifier of the ledger.

The systems also determine a level of confidence for the identified use of the computing environment in the specified particular policy context. This determination can be made, for example, by selecting the determined level of confidence from a plurality of different levels of confidence and/or by calculating and quantifying the level of confidence based on analytic computations.

In other embodiments, systems are configured for deterministically managing execution of actions based on assessed risks associated with different computing environments and policies based on a determination of whether an identified level of confidence satisfies a requirement of the policy associated with performing the action in a particular context corresponding to a particular computing environment.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Figure 1:
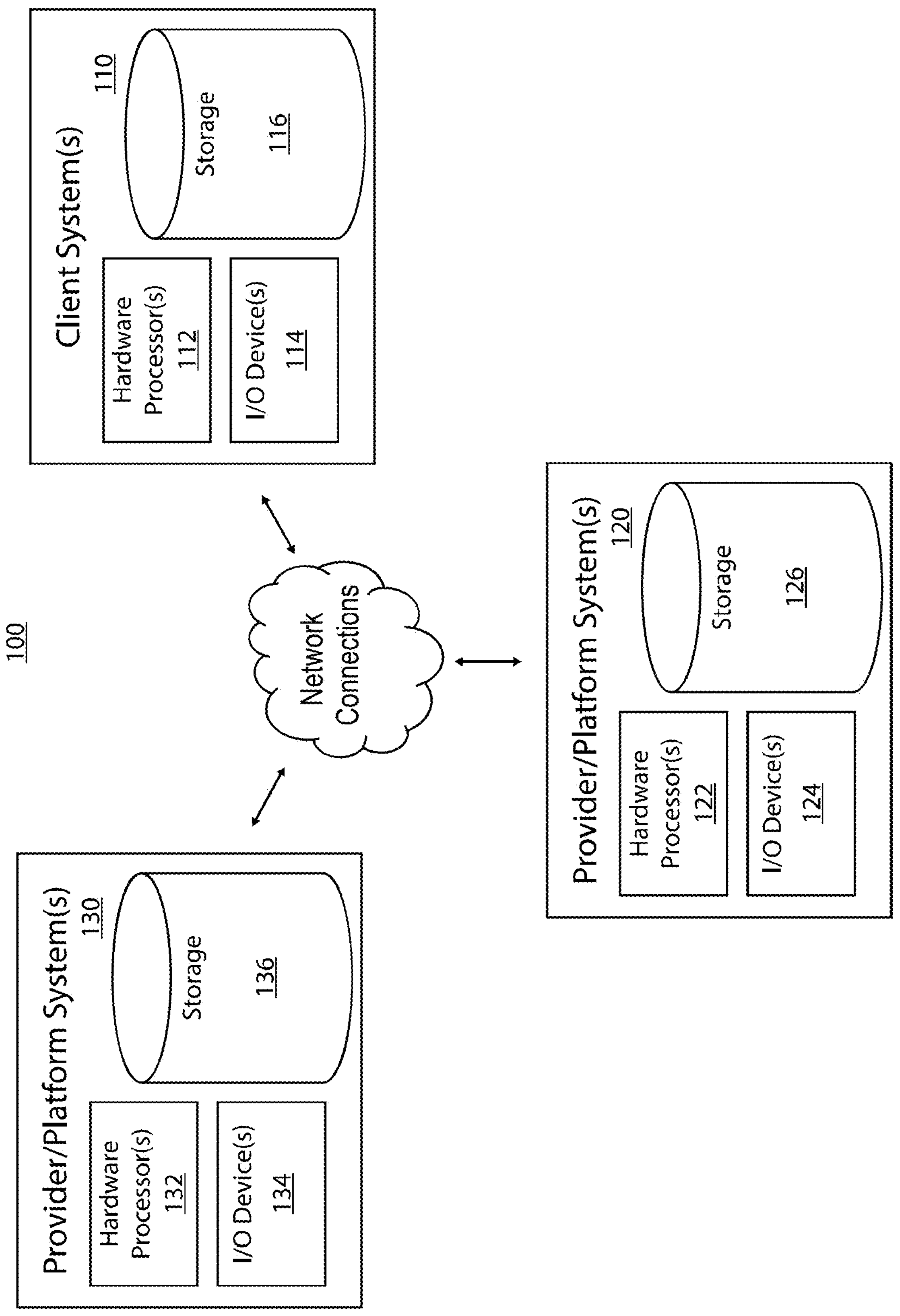
FIG. 1 illustrates a computing environment that incorporates systems that comprise and/or that may be used to implement aspects of the disclosed invention.

In modern computing, as systems have continued to become more complex and distributed, it is increasingly difficult to provide secure and trusted computing environments. It is also becoming increasingly difficult to even assess the overall compliance of a computing environment that is currently deployed or that is anticipated to be deployed according to different policy contexts.

The term policy and policy context, as used herein, means a predefined requirement, or set of requirements that must be complied with to be compliant with the policy. The policy may specify, for example, any combination of required protocols, schemas, hardware or software configurations, controls and restrictions on authorized use, security, resilience, requirements for upgrades, accessibility, compatibility, security, performance, component utilization or integrity, rollback, resiliency, integration, run-time quality of service, and/or other similar types of policy requirements.

The context of the policy may be an employer context, a government context, a protocol context, a contract and/or subscription context, a geographic and/or temporal context, a networking context and/or any other context in which a computing environment may be deployed or utilized.

In view of the foregoing, it will be appreciated that the referenced policy contexts can include any combination of policies and contexts in which a computing environment is being utilized.

While it is theoretically possible for an administrator to track down and assess the authenticity and integrity of each computing component utilized in a computing environment, to ensure compliance of a computing system with a particular policy context, it is prohibitively difficult to manually assess and track the integrity of all the different computing components that are currently being used and/or that are anticipated to be used in a particular deployment of a computing system in a given computing environment.

Disclosed systems and methods are provided for generating and managing evidence ledger records for facilitating the analysis and attestation of the integrity and authenticity of computing components and the overall compliance of corresponding computing environments, including specific computing systems, for different contexts and policies.

The disclosed embodiments provide many technical benefits over conventional security management software. For instance, the disclosed embodiments identify and memorialize the attestations of authenticity and integrity for different software and hardware as verifiable ledger records. The referenced ledgers and corresponding ledger records can include various types of evidence, including SBOM (Software Bill of Material) records, trusted code records, backdoor scan records, confidential computing records, TPM (Trusted Platform Module) records, and other attestation and verification records of evidence. The evidence can be stored together in a single ledger repository and/or linked by the ledger records as virtual references to remote records.

Benefits and technical advantages of the disclosed embodiments also include the use of the disclosed ledger records to generate endorsements for different computing environments, to provide assurances of compliance for different policy contexts.

The benefits and technical advantages provided by the disclosed embodiments also include using the ledger records to manage and deterministically control the deployment and/or use of particular computing processes based on assessments of trust and conformity made from the memorialized ledger records.

The technical benefits provided by the disclosed embodiments also includes the use of the ledger records to facilitate security and compliance of different computing processes and to, for example, prevent deployments and activities that are non-compliant for different policies and contexts.

Attention will first be directed to FIG. 1. In this illustration, a computing environment 100 includes a client system 110, a server system 120 and third-party system(s) 130 that are connected through various wired and wireless connections. Each of these systems may be configured as a standalone system and/or as a distributed system, with the constituent components of each system being stored in either a single location and/or distributed in different locations.

The constituent components of the client, system and third-party systems include respective hardware processor(s) (112, 122, 132), input/output device(s) (114, 124, 134) and storage (116, 126, 136).

The input/output device(s) (114, 124, 134) comprise software and hardware components for receiving user input and for rendering output.

The storage (116, 126, 136) stores code in the form of computer-executable instructions that are executed by the one or more hardware processor(s) (112, 122, 132) to implement functionality disclosed herein.

It will be appreciated that the referenced ledgers, ledger records, evidence, policies, and endorsements can also be stored in any combination of the referenced storage units of the different client, server, and third-party systems to facilitate implementation of the disclosed embodiments.

In some embodiments, a system (e.g., client or server system) is configured to generate a ledger record of verifiable evidence that attests to the authenticity and integrity attributes of hardware and software components of a particular computing environment. These hardware/software components may include processors, storage devices, chips, modules, drivers, applications, firmware, third-party software, operating systems, hypervisors, network connections, and other types of hardware and software.

After the ledger is created, it can be signed or otherwise sealed with a strong identifier (e.g., hash and/or security key), to provide a level of assurance that the attestations and evidence in the ledger record have not been tampered with. The ledger record can be shared with different systems and referenced to assess a level of confidence of a computing environment relative to a particular policy context, as will be described in more detail below. Subsequent and corresponding endorsements and controls can also be based on the assessed level of confidence in the evidence contained in the ledger record(s).

Figure 2:
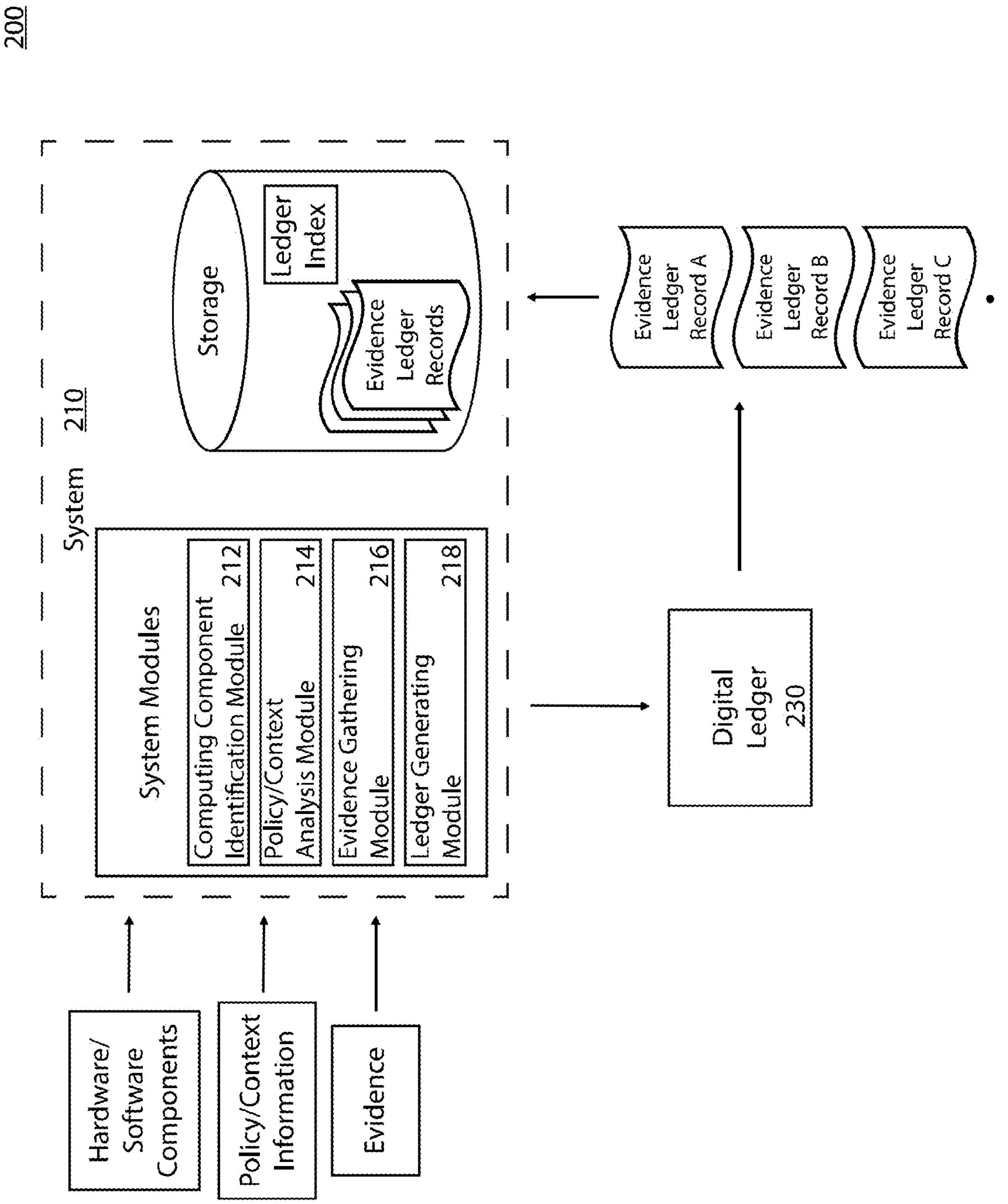
FIG. 2 illustrates a computing environment that illustrates a system that comprises and/or that may be used to implement aspects of the disclosed invention.

FIG. 2 illustrates an embodiment 200 in which a system 210 (e.g., client system or server system) generates various evidence ledger records that contain evidence that can be used to validate the authenticity and/or integrity of various hardware and software components used in various computing environments.

In this example, the system 210 uses various modules to obtain the information needed to generate the ledger records and to create, store and index the ledger records. For example, a computing component identification module 212 is used by the system to identify the different hardware and software components that are currently being used, or anticipated being used, in a particular computing environment and which will be the basis of an evidence ledger.

The computing component identification module 212 identifies this information by scanning boot and runtime configuration records and/or by receiving the specified information from a client request for an endorsement for a particular type of computing environment, and/or by receiving this information from another entity (e.g., a third-party entity). In some instances, the system selectively identifies a set of hardware and/or software components that are specified in a particular policy as being relevant to ensure compliance with the policy.

This policy information can come from a third-party source and/or the client system requesting the endorsement of a particular computing environment according to a particular policy context. The policy context can include a particular time, location, configuration, use, restriction, control, and/or any other policy that is applied to a computing environment (e.g., computer system hardware and software configuration). The policy may be applied by a software or hardware manufacturer, an enterprise that uses the software/hardware, and/or a government or other entity that applies jurisdictional rules applicable to the use of the software/hardware.

Evidence that can be used to verify the configuration, integrity and/or authenticity of the different software and hardware components is, sometimes, stored with the software and hardware components (E.g., SBOMs, TPMs, etc.). In other instances, the evidence is stored as separate records that are associated with the software/hardware components, but which are created on demand, when needed by the system. For instance, the system may perform a backdoor scan analysis on a component prior to use of the component. The system can store this scan record separately from the component during periods of non-use. Likewise, attestations regarding a key vault or other type of key management verification, trusted code analysis and/or confidential computing can also be stored separately, as stand-alone records.

Regardless of the manner in which the evidence is generated or how it is stored, the system 210 will identify the relevant hardware/software components that are being used in a current or anticipated computing environment configuration, as specified by a user or current runtime configuration, and based on the policy/context that is determined to be relevant for that configuration of the computing environment.

The relevance of a policy/context for an identified computing environment is determined by the policy/context analysis module 214. This module identifies the current policies applicable to a current or anticipated computing environment based on location, time, user and other policy contexts, as specified by user input and/or third-party inputs. With this policy/context information, the system uses the computing component identification module 212 to identify the particular hardware/software components that a ledger record should be created for and which can be used as a verifiable record of a level of confidence for the computing environment in a given policy context.

In some instances, the identified hardware/software components are only a subset of all hardware and/or software components that are available for use by a computing system and/or that are even used in a particular identified configuration of the computing system or computing environment. In other instances, the identified hardware/software components include a full set of all hardware/software components that are being used and/or that are anticipated to be used in a particular configuration/use of the computing environment.

The system 210 uses an evidence gathering module 216 to identify the evidence records associated with each of the identified hardware/software components. In some instances, the evidence gathering includes identifying the relevant SBOMs that are applicable to software components that are running or anticipated to be run. In other instances, the evidence gathering includes identifying backdoor scan records for different components. This may also include running the actual backdoor scans for the identified components. Evidence gathering may also include identifying TPM verifications and other chip and container verifications. Evidence gathering may also include performing a key vault or other type of key management verification and identifying other registry and enclave attestations regarding trusted code or confidential computing.

Evidence gathering may include any combination of the foregoing, and/or the identifying and generating of other types of records regarding attestations or certifications that can be used to verify software/hardware authenticity and integrity.

Once the evidence records are identified and gathered, they are added to a single evidence ledger 230. Some evidence records are encrypted, signed and/or associated with a verification that creates a level of assurance that the evidence records are not tampered with. In these instances, the evidence gathering module will obtain the necessary decryption keys and/or perform other processing of the evidence records to verify that they are authentic and have not been tampered with. Such processing may include interfacing with remote parties that manufactured the relevant components and/or with third-party certification entities that attest to the integrity and authenticity of the components. For instance, the system may issue a request for confirmation from a third-party source to provide and/or to provide a certification of authenticity for a particular component.

In some instances, the ledger generating module 218 stores all of the identified evidence within a single container or domain. Alternatively, the ledger generating module 218 stores different portions of the evidence in different and disparate storage locations/domains. In some instances, the ledger is a virtual record that identifies the different pieces of evidence and their locations, along with links to the evidence.

In some instances, the ledger generating module 218 includes context information with the ledger evidence records, such as a time and configuration of the computing environment that the hardware/software components correspond to, as well as versioning information for the different components.

It will be appreciated that when the computing environment is a virtual machine environment or any type of distributed environment, the ledger may also include evidence for a plurality of different computing systems, including host and client systems, as well as networked systems.

Once the ledger has been created, a ledger index may be created or updated with a ledger record that associates different hardware/software components, computing environments and/or associated evidence with a hash, security key, or other strong identifier that is used to render the ledger immutable. For instance, once the ledger is created, the ledger generating module 218 can effectively seal the ledger 230 with a hash, a hash signed with a private key, and/or with other strong identifier that can be used at a later time to provide an assurance that the ledger has not been tampered with. (E.g., at a time prior to or while relying on the evidence in the ledger to make a requested endorsement or security analysis). In this regard, the ledger 230 can be considered an immutable ledger.

It will be appreciated, however, that while the ledger 230 is immutable, the ledger 230 can be updated and saved as a new and separate instance of the ledger 230 to account for newly detected changes to the computing environment. Any new instances of the ledger will be saved with their own strong identifier and index records. In some instances, rather than creating a completely separate ledger instance, an existing instance is updated by appending the ledger with new information and by resigning the ledger with an identifier to provide a verification of validity and authenticity for the updated/appended ledger.

In alternative embodiments, a newly created ledger for a particular computing environment, created at a different time and/or for a different context, will overwrite an original ledger for the same computing environment.

In some instances, when a new instance of a ledger is created, the new ledger is generated from an existing ledger, copying all of the same evidence of the prior ledger, and then only the portions of the original ledger that are outdated are modified with new evidence in the new ledger. In other embodiments, rather than updating an old ledger with modifications, by changing copied portions of the ledger with new evidence associated with updated components, it is also possible to generate an entirely new ledger from scratch by obtaining the evidence for all of the relevant components directly from the evidence sources.

In some instances, a plurality of different ledger instances are created for different periods of time and/or in response to detecting a particular type of action being performed within the computing environment, even when there is no underlying change to the hardware/software components of the computing environment. For instance, in response to detecting a different period of time and/or a different user logged into the computing environment and/or action performed by the user, the system may generate a different instance of the ledger to reflect a current state of trust for the system at that particular period and context.

When different ledgers and ledger instances are created for different periods of time and/or for slightly different combinations of evidence, each ledger record can be stored and indexed separately (e.g., Evidence Ledger Record A, Evidence Ledger Record B and Evidence Ledger Record C can all be based off of a common ledger 230 and corresponding computing environment, but each corresponding to a different time, context, or combination of evidence records, etc.). Other ledger records based on different configurations of the same or different computing environment, with new or updated components, can also be stored and indexed in the same system and ledger index structures.

In some alternative embodiments, not shown, the ledger 230 is split into separate sub-ledgers that each correspond to different subsets of the software/hardware components. For instance, a first sub-ledger may correspond to all host components and a second sub-ledger may correspond to all client components. Likewise, different sub-ledgers may be partitioned to focus on evidence related to hardware components while others are focused on software components. Each of the different sub-ledgers can be indexed separately, if desired, and each being sealed with its own strong identifier (e.g., hash or another strong identifier).

Figure 3:
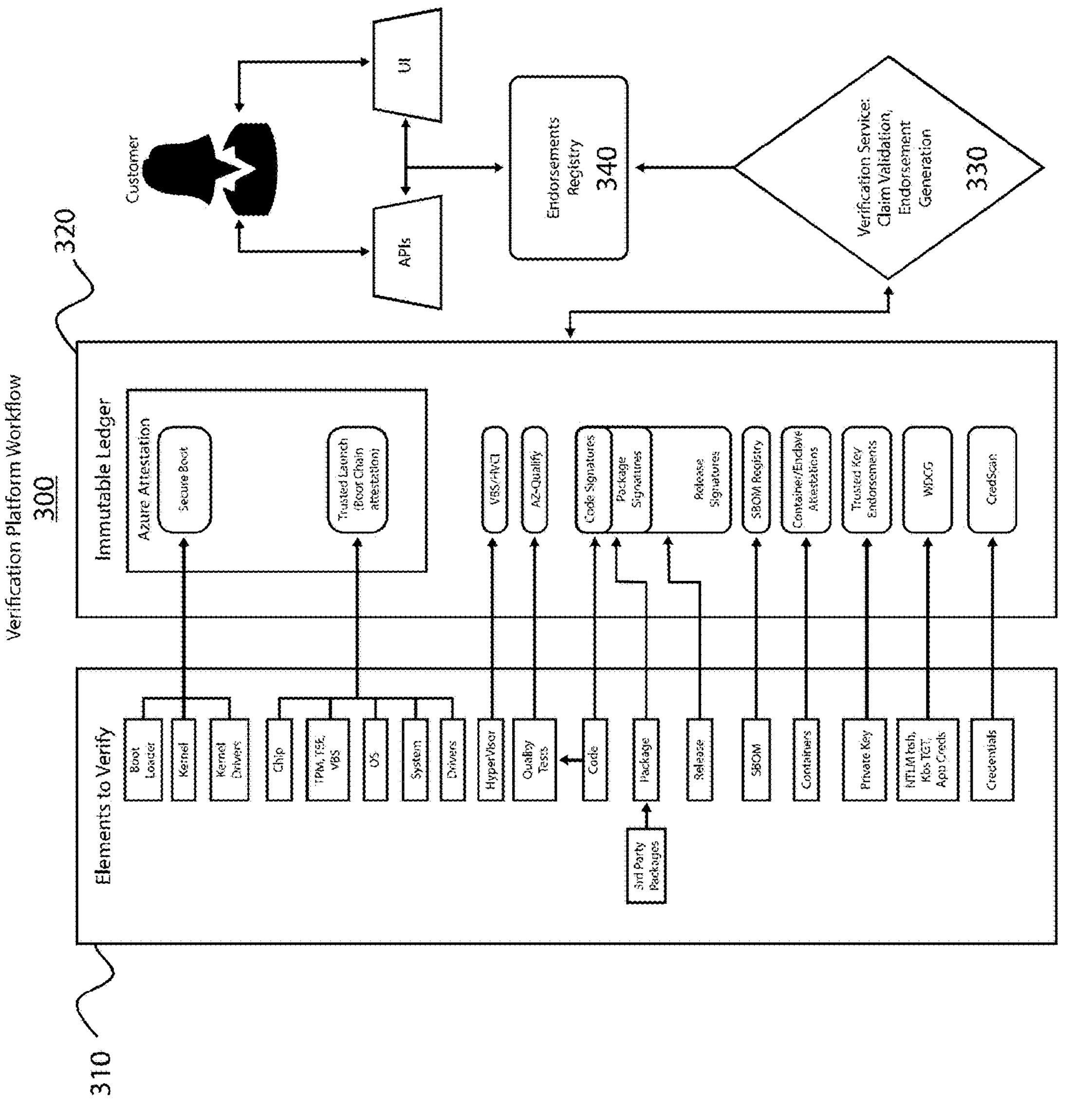
FIG. 3 illustrates an example of an environment in which a verification platform workflow is used to generate and use immutable ledgers according to the disclosed embodiments.

FIG. 3 illustrates one non-limiting example of a verification platform workflow 300 that can be used to generate and use ledgers to endorse different levels of confidence or trust associated with different computing environments. In this illustration, different components (e.g., elements to verify 310) are considered and referenced when identifying, generating and/or adding evidence associated with the components to a ledger (e.g., immutable ledger evidence 320).

By way of example, the verification platform can support evidence associated with (i) a boot loader and kernel, along with the kernel drivers, to generate a secure boot attestation or log of boot components to ensure that they are trustworthy and not infected with malware, (ii) system chips, TPM, TEE (trusted execution environment), VBS (virtualization-based security) enclaves, OS, Drivers and other system components for generating attestations of a host machine location, posture of a virtual machine on the host machine, and the environment of the enclaves running on the VM, (iii) SBOMs for different software components running on the system to attest to the code and dependencies associated with the software components that the SBOMs correspond to, (iii) various third-party packages and other code for which attestations are generated and for which signatures are used to provide an assurance of the version and origin of the packages, (iv) seals of approval or certificates for specified bills of quality to attest to safety and reliability measures, (v) containers and enclave attestations associated with certain levels of trust, security and trusted execution environments, (vi) WDCG (Window Defender Credential Guard) attestations/records to identify passwords, hashes, Kerberos Tickets, and application credentials, (vii) security keys and other credentials for corresponding trusted key endorsements and credit scan attestations.

Ledgers can include any evidence referenced above, as well as any other evidence associated with any software and/or hardware components of a computing environment. It will also be appreciated that each piece of evidence may be signed or unsigned by the evidence issuing entity.

After the ledger is generated, it can be rendered immutable by generating a hash or other strong identifier with the ledger. The ledger can also be encrypted and/or otherwise secured from unauthorized access and modification by application of different encryption keys and cryptography.

As further shown by the illustration of FIG. 3, a verification service 330 can be used to access and use the ledger evidence. By way of example, once the ledger is generated and rendered immutable, a verification service can access the ledger on a predetermined schedule and/or on demand, to verify claims associated with evidence in the ledger. This may include, for example, responding to requests for endorsements regarding levels of confidence for computing environments that incorporate hardware/software components referenced by attestations and other evidence in the ledger (e.g., confidence in the evidence of the components being used in the computing environment in a given policy context). These computing environments may be current deployments or configurations of a system and/or anticipated deployments or configurations of the system.

It will be appreciated that the verification service may be provided by the system that generates the ledger. Alternatively, the ledger may be shared with the verification service directly (e.g., as a shared object) and/or indirectly (e.g., by providing access to information contained in the ledger when requested).

When endorsements are generated as part of the verification process, registry records can be created and stored for current and future access. The endorsements, for example, can be stored in an endorsement registry 340 so that requested endorsements can be found and shared with requesting parties. By way of example, when a user requests a particular endorsement, if one exists, it is provided. Alternatively, if one does not yet exist, the verification service can generate and register the requested endorsement.

Different types of endorsements or compliance records that reflect a level of confidence or trust with using a computing environment in a particular policy context can also be made. In this regard the level of confidence is a confidence in the evidence found in the ledger for the components being used in a particular policy context. These records/endorsements, which are based on the ledger evidence, can be created, registered and tracked over time, so as to reflect changes in conformity/compliance over time.

Figure 4:
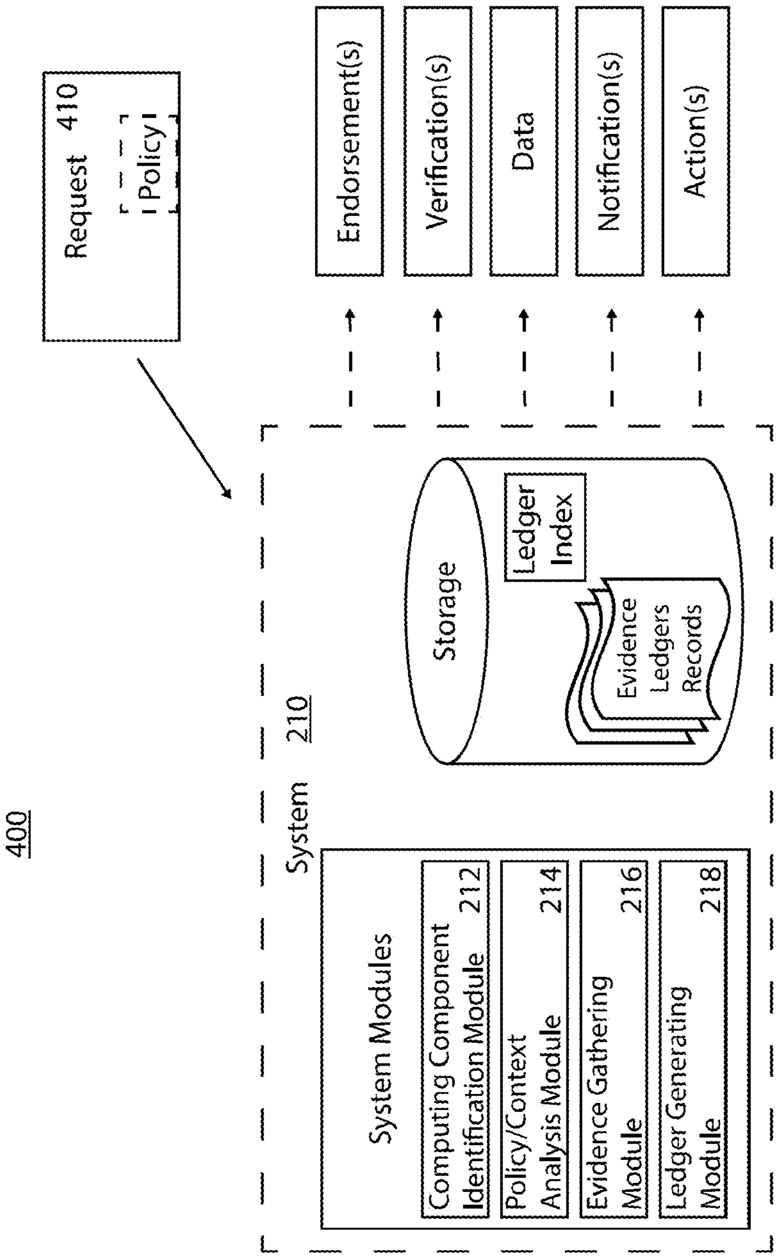
FIG. 4 illustrates a computing environment that illustrates a system that comprises and/or that may be used to implement aspects of the disclosed invention.

FIG. 4 illustrates an environment 400 in which a system 210 performs some of the aforementioned verification services. In this embodiment, the system 210 receives a request 410 for which a response is dependent upon a level of level of confidence in the evidence for the components being used in a particular computing environment and according to a particular policy context. The request 410, for example, may be a request to access certain resources, or to perform a certain action. The request 410 may also be a request for an endorsement or verification of a level of confidence in a particular computing environment in a given policy context. In some instances, the request is a request to deploy/instantiate or link a new component to the particular computing environment.

The request may be received through a user interface presented to a user. The user interface, for example, may allow a user to select specific components and/or configuration and contexts for which an endorsement is requested. The interface may also allow a user to select or identify a policy for which the endorsement applies.

In some instances, various APIs are provided for presenting the different component, policy, context and configuration information to the user and for receiving input selecting the specified component, policy, context and configuration information. The user interface/APIs are also used generate the user request and to receive corresponding replies.

When the request 410 is received, the system 210 identifies the relevant hardware/software components of the computing environment and the policy that is applicable. In some instances, the policy is included in or identified with the request. In other instances, the policy is identified by the policy/context analysis module 214 separately from the specific request. This policy, for instance, may be gathered from an ongoing quality of service record, contract, or a known third-party or jurisdictional requirement.

Once the relevant policy and system components are identified, the system identifies the relevant evidence ledger records (e.g., immutable ledgers) that have the relevant evidence. This identification may occur, for example, by referencing the ledger index and identifying ledgers that are indexed as having the identified components. This may also include identifying one or more ledgers from a plurality of different ledgers that may each be applicable to the identified components. In some instances, this may include identifying selected portion(s) of one or more ledgers that contain evidence for the identified components.

Once the relevant ledger(s) and evidence is identified, the system verifies the evidence, such as by verifying that the associated immutable ledgers have not been tampered with. This process may include using by using the hash, a hash signed with a private key, and/or by using other strong identifiers referenced in the corresponding ledger records to verify the contents of a particular ledger have not been altered.

Alternatively, the verification of the evidence may include interfacing with a third-party to ensure that the evidence is accurate.

After verifying that the relevant immutable ledger(s) have not been tampered with and/or that the evidence is accurate, the system assesses the evidence in view of the given policy and determines a level of confidence for the computing environment in the given policy context.

This determination of the level of confidence may include calculating a score that is based on an algorithm that considers different weighting applied to different pieces of evidence. (e.g., different attestations count for different values in the algorithm). The determination may also be a simple pass/fail analysis as to whether the evidence includes certain attestations that are required by the policy. The determination may also comprise a listing of attestations for a selective or subset of different policy requirements from a larger grouping of known policy requirements, rather than providing a statement or attestation of validity or authenticity for all of the known or considered policy requirements.

Once the analysis or assessment of the evidence is completed, the system generates an appropriate response. In some instances, the response is an endorsement or verification that includes or specifies the level of confidence for a prior, current, or future use of a computing environment in a particular context. In other instances, the response includes requested data or an action that was requested. In other instances, the response is a notification, such as a grant or denial notification. In some instances, the endorsement record comprises a listing of components from the selected set of computing components with a compliance identifier for each listed component in the listing of components.

The endorsement may be a particular endorsement classification, label or tier that is selected from a plurality of different endorsement classifications, labels or tiers corresponding to differing levels of confidence associated with the evidence in the ledger records for a corresponding computing environment operating in a given policy context.

In some embodiments, the response is not limited to a particular endorsement. Instead, for example, the response can be a deterministic response to perform an action, or not, entirely dependent upon the determined level of confidence. For example, if the determined level of confidence is below a certain threshold, the system may deny the request and/or refrain from taking or authorizing a desired action. Alternatively, when the determined level of confidence is above the certain threshold, the system may grant the request and/or authorize or take a desired action.

In additional embodiments, the system may determine a change that can be made to improve the determined level of confidence for the use of the computing environment level in a particular policy context. The system may add this information to the endorsement or a related notification. The system may also initiate a potential change to improve the overall level of confidence for using the computing environment in the desired manner. Notifications of any such changes can also be provided with the resulting endorsement at the higher level of confidence. The system can determine the change to be made based on policy requirements and that will make a system more compliant with the known policy, for example.

In some instances, the system will generate a notification of a reason for refraining from performing a requested the action, along with a change that can be made to the computing environment that will enable the performance of the action, according to a policy context and according to the determined level of confidence. In such instances, the system may also detect when the change is made (either in response to a user input and/or in response to automated systems). Then, when the change is made that results in a determination that the system is now compliant with a threshold/required level of confidence (as verified by the evidence records in new ledger records corresponding to the change), the system will automatically perform the desired action.

Additional examples of the processes that may be performed are described in more detail below, with reference to the flow diagrams shown in FIGS. 5-7.

Figure 5:
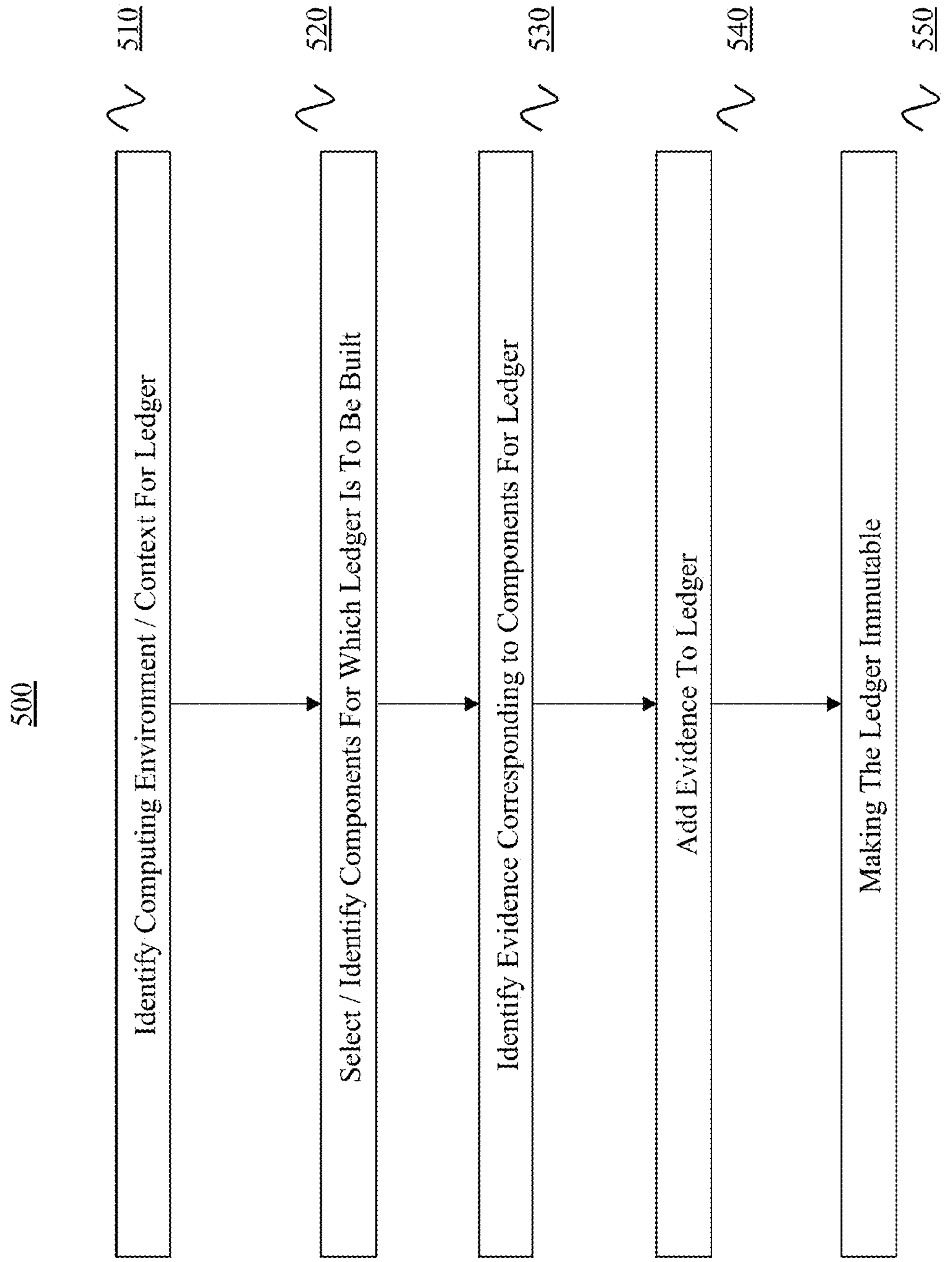
FIGS. 5-7 illustrate flow diagrams of acts included in methods for generating and using immutable ledgers of evidence according to the disclosed embodiments.

The flow diagram 500 in FIG. 5, for example, corresponds to acts associated with methods for generating and utilizing ledgers corresponding to different computing environments and for generating corresponding endorsement records based on policies applied to the computing environments. As shown, the first illustrated act includes a system identifying a computing environment that includes a plurality of different software components and a plurality of hardware components (act 510). This identification may be performed by referencing a computing environment or configuration that is intended to be used or that is currently being used. The identification may be performed automatically and/or in response to a specific user request entered through a user interface. The user interface may be presented as an application menu interface, a control dial interface, as a checkbox interface, as an input field interface, as a drag and drop interface, as a selectable template interface, or any other type of user interface. The interface may also be a standalone and dedicated portal interface associated with the validation processes described. Alternatively, the interface may be a component or sub-interface of another application.

Next, the system determines a selected set of computing components from the computing environment to generate a ledger for (520). This selection of hardware/software components is based, in some instances, on a current deployment and utilization of the computing environment. In other embodiments, the components correspond to an anticipated use of a computing system.

Next, for each computing component in the selected set of computing components, the system identifies whether there is any electronic record of evidence that is known and available for inclusion into the ledger of evidence (530).

Then, the system obtains and adds the relevant/identified electronic records of evidence into the ledger (act 540). In some instances, this includes adding each electronic record of evidence that is known and available for inclusion into the ledger of evidence, for each computing component in the selected/identified set of computing components. In other instances, this includes adding only a subset of the available and known and accessible evidence records.

To make the ledger immutable, the system also generates a hash or other strong identifier for the ledger that is associated with the ledger and that is verifiable for providing a level of assurance that contents of the ledger have not been modified (act 550).

Ledger index records are also generated for each ledger to identify and associate the different computing environment components with the corresponding evidence and strong identifier that can be used to verify the contents of the ledger.

Figure 6:
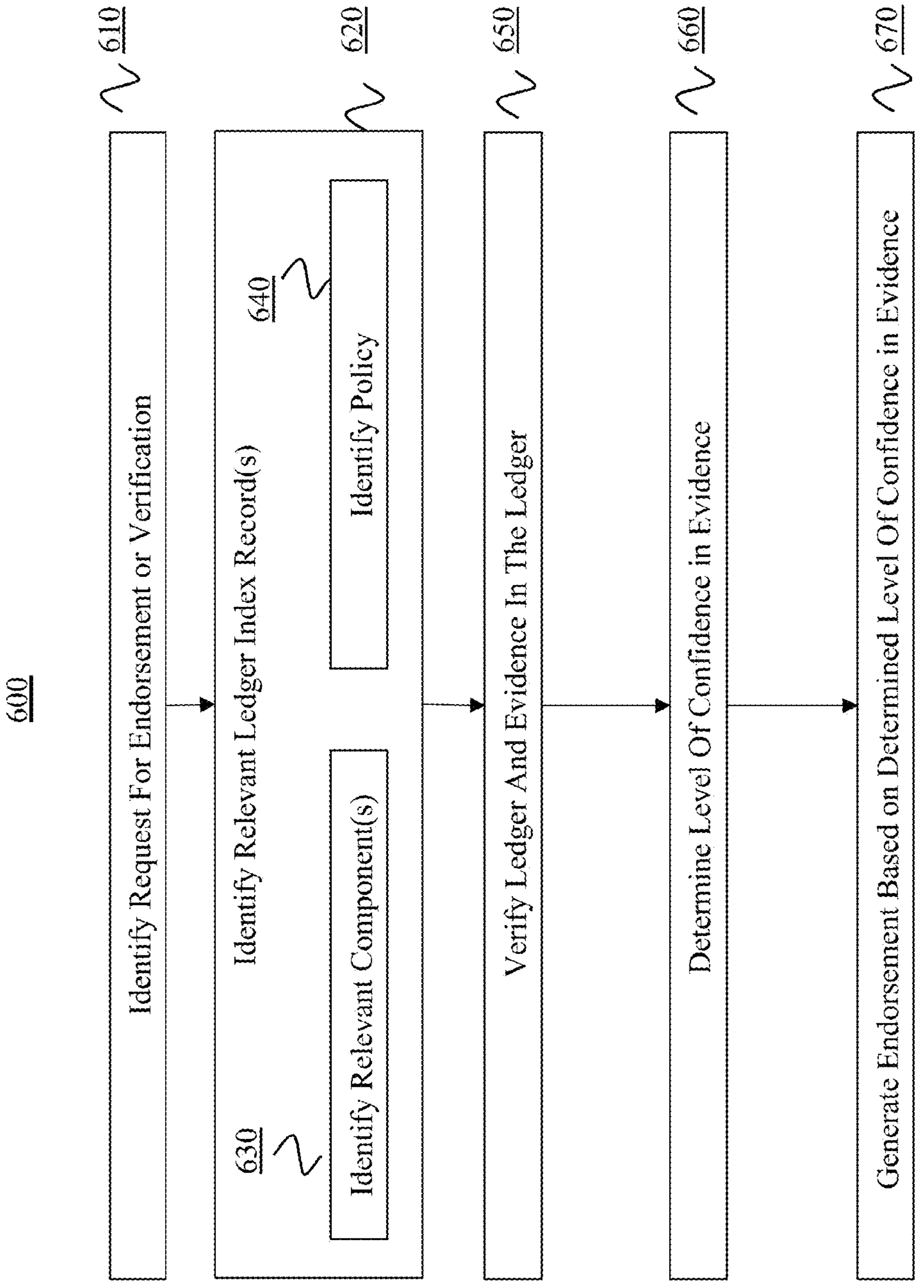

FIG. 6 illustrates acts associated with related methods for generating endorsement records that reflect a determined level of confidence for continued or anticipated use of computing environments in particular policy contexts (e.g., at a particular time, at a particular location, with a particular user, etc.).

The first illustrated act is identifying a request to generate an endorsement record corresponding to an identified use of the computing environment in a particular policy context (act 610). Then, in response to the request, the system identifies the relevant ledger index record associated with the identified use of the computing environment in the particular policy context (act 620). This may also include identifying the relevant components that are being used by an identified computing configuration (act 630), a particular policy applicable to the identified use (act 640), and/or a particular context of use (e.g., user, time, configuration), as previously described. This may also include receiving/identifying user input that specifies the evidence to be considered for a requested endorsement or verification. This user input, for example, can be received through a user interface or portal to a verification service/application.

Next, the system verifies that the ledger has not been modified (act 650). In some instances, this verification includes generating a hash of the ledger and comparing it to the stored hash of the ledger.

Next, the system determines a level of confidence for the identified use of the computing environment in the particular policy context (act 660). In some instances, the system determines the level of confidence by selecting the determined level of confidence from a plurality of different levels of trust and conformity that correspond most closely with the attestations made by the ledger. In other instances, the level of confidence is a numeric value that is generated by computing values associated with each attestation in the ledger. The determined level of confidence may also comprise a label reflecting an endorsement or trust/conformity tier selected from a plurality of different labels associated with correspondingly different endorsement or trust/conformity tiers.

After determining the level of trust and conformity of the computing environment in the specified policy/context, the system generates the corresponding endorsement that reflects the determined level of confidence (act 670). This endorsement may be a binary verification that a system is compliant. The endorsement may be a numerical value that reflects a percentage or threshold of compliance. The endorsement may also include a listing of attestations. In some embodiments the endorsement lists components that are compliant and components that are not compliant.

The endorsement may correspond to different types of validations, such as, but not limited to validations of upgrades, accessibility, configurations and compatibility, security, performance, component utilization or integrity, rollback, resiliency, integration, run-time analysis, etc.

Figure 7:
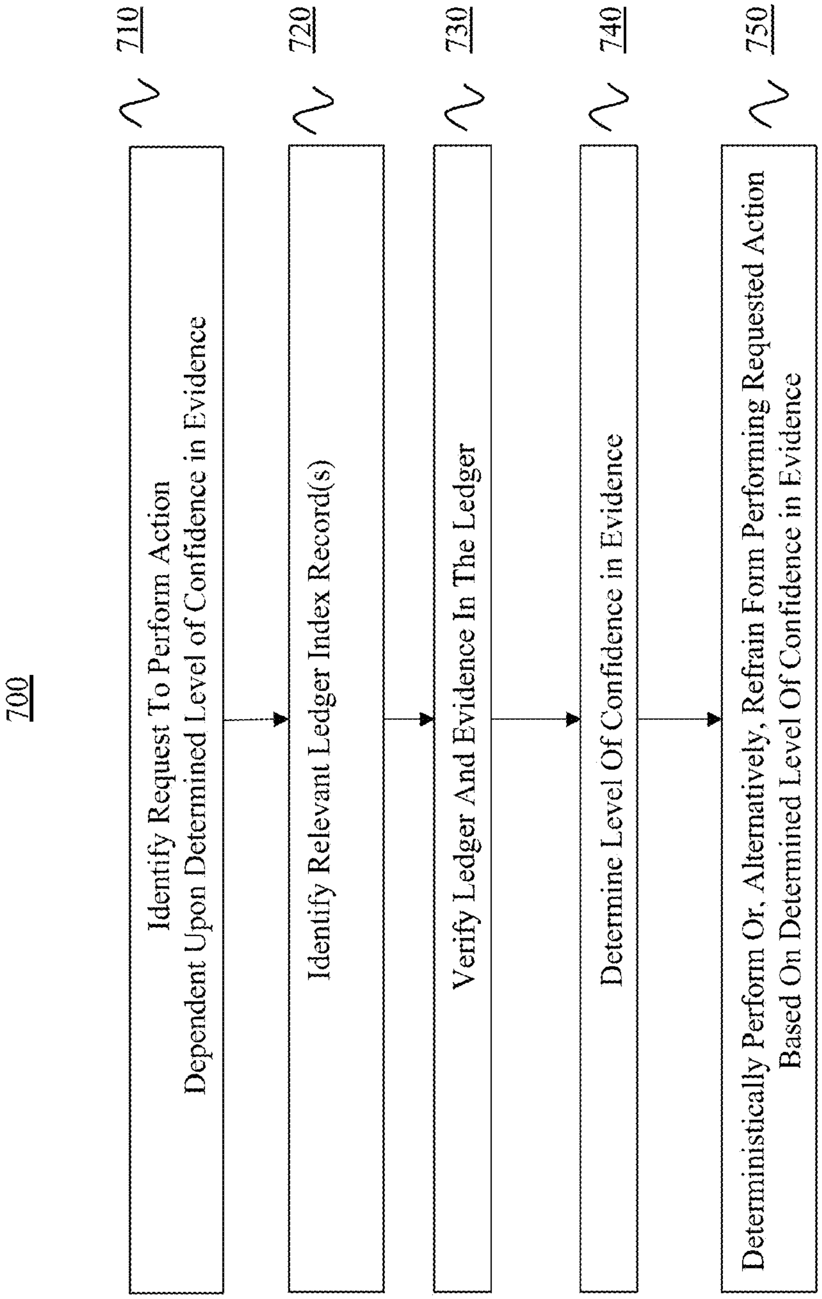

FIG. 7 illustrates a flow diagram 700 of acts for related methods in which the disclosed verification platform and corresponding ledgers are used to deterministically perform or refrain from performing requested actions.

As shown, for example, a system identifies a request to perform an action in a computing environment in a particular policy context (act 710). The policy context associated with the request may comprise a particular type of use, user, location, configuration, or other context for using the computing environment. The policy context may be explicitly or implicitly defined by or included with the request. Some or a portion of the policy context may also be obtained independently from the request.

Next, in response to the request, the system identifies the relevant ledger index record associated with the identified/requested use of the computing environment in the particular policy context (act 720). As before, this may also include identifying the relevant components that will be used by an identified computing configuration to perform the desired action, as well the particular context of use (e.g., user, time, configuration), as previously described.

Next, the system verifies that the ledger and evidence in the ledger have not been modified (act 730). Next, the system determines a level of confidence, (e.g., level of trust and conformity for the requested use in the particular policy context (act 740). Then, after determining the level of confidence/trust and conformity for the requested use, the system deterministically performs/authorizes the requested action when the determined level of confidence or trust/conformity exceeds a particular threshold or, alternatively refrains from performing/authorizing the requested action when the determined level of confidence or trust/conformity falls below a particular threshold.

Some embodiments also include tracking changes in a computing environment (e.g., a change in a particular software component used in the computing environment) and generating new ledgers and/or endorsements based on the changes. For instance, in some instances, a system will detect a change in a computing component utilized in the computing environment and, in response to the detected change, determine whether to generate a new ledger. When a determination is made to generate a new ledger, the system will obtain the relevant new or existing evidence corresponding to the changed component, including any new or existing electronic records for the component that has been detected as being changed. The system will then generate a new ledger index record that includes an identification of components and evidence associated with the new ledger and that associates the strong identifier with the new ledger. Similarly, new endorsements can also be created.

When an endorsement is requested, for which there are multiple ledgers and ledger records, the system will determine whether to use or to refrain from using the new and different ledger index records based on a corresponding context for which the endorsement is requested. If, for instance, the endorsement corresponds to a time prior to the generation of a new ledger record, the new ledger record is not relevant and will not be used.

In some embodiments, after an endorsement is requested, the system will continue to monitor for potential changes to components in the computing environment and that are related to the context of the requested endorsement. Then, when a change is detected for a particular component in the particular computing environment/context, the system will generate a correspondingly updated endorsement record. This updated endorsement record will be associated with the identified use of the computing environment in the particular context for which the original endorsement record was create. The new endorsement will be based on electronic records of evidence included in new ledger records created in response to the newly detected changes, including any new electronic records for the computing component that was been detected as being changed. In some instances, the updated endorsement record will identify a new level of confidence or trust and conformity for the identified use of the computing environment in the particular context with the computing component that has been detected as being changed.

With regard to the foregoing, it will be appreciated that the disclosed embodiments may include or be practiced by a computer system configured with one or more processors and computer-readable media such as computer memory. In particular, the computer memory may store computer-executable instructions that when executed by one or more processors cause various functions to be performed, such as the acts recited in the embodiments.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical computer-readable storage media and transmission computer-readable media.

Physical computer-readable storage media includes RAM, ROM, EEPROM, CD-ROM or other optical disk storage (such as CDs, DVDs, etc.), magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer-readable media to physical computer-readable storage media (or vice versa). For example, computer-executable instructions or data structures received over a network or data link can be buffered in RAM within a network interface module (e.g., a "NIC"), and then eventually transferred to computer system RAM and/or to less volatile computer-readable physical storage media at a computer system. Thus, computer-readable physical storage media can be included in computer system components that also (or even primarily) utilize transmission media.

Computer-executable instructions comprise, for example, instructions and data which cause a general-purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAS, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computing system comprising:

one or more hardware processors; and one or more storage device having stored computer-executable instructions which are executable by the one or more hardware processors for causing the computing system to implement a method for generating and utilizing digital ledgers corresponding to different computing environments and for generating corresponding endorsement records based on policies applied to the computing environments, wherein the method comprises the computing system:

identifying a computing environment that includes a plurality of different software components and a plurality of hardware components;

determining a selected set of computing components from the plurality of software and hardware components to generate a ledger, wherein a selection of the selected set of computing components is based on a specified deployment and utilization of the computing environment;

for at least one computing component in the selected set of computing components, identifying whether there is any electronic record of evidence that is known and available for inclusion into the ledger of evidence;

adding electronic records of evidence into the ledger, including adding at least one electronic record of evidence that is known and available for inclusion into the ledger of evidence for at least one computing component in the selected set of computing components; and generating a strong identifier for the ledger that is verifiable for providing assurance that contents of the ledger have not been modified.

2. The computing system of claim 1, the method further including:

generating a ledger index record that includes an identification of components and evidence associated with the ledger and that associates the strong identifier with the ledger.

3. The computing system of claim 2, wherein the method further includes:

identifying a request to generate an endorsement record corresponding to an identified use of the computing environment in a particular policy context;

identifying the ledger index record based on the configuration of computing components associated with the identified use of the computing environment in the particular policy context;

verifying the ledger has not been modified based on the strong identifier;

determining a level of confidence of the electronic records of evidence for the identified use of the computing environment in the particular policy context, the determined level of confidence of the electronic records of evidence being selected from a plurality of different levels of confidence; and generating the endorsement record that reflects the determined level of trust and conformity for the use of the computing environment level in the particular policy context.

4. The computing system of claim 3, wherein the use of the computing environment in the particular policy context comprises a current use of the computing environment.

5. The computing system of claim 3, wherein the use of the computing environment in the particular policy context comprises a prior known use of the computing environment.

6. The computing system of claim 3, wherein the use of the computing environment in the particular policy context comprises a requested future use of the computing environment.

7. The computing system of claim 3, wherein the method further includes:

generating a plurality of different endorsement records for uses of the computing environment in the particular policy context at different times; and utilizing the plurality of different endorsement records to assess any changes in a level of compliance for the use of the computing environment in the particular policy context over time.

8. The computing system of claim 3, wherein the use of the computing environment in the particular policy context comprises a use of the computing environment in a particular geography.

9. The computing system of claim 8, wherein the method further includes:

generating a plurality of different endorsement records for uses of the computing environment in the particular policy context at different locations.

10. The computing system of 3, wherein the use of the computing environment in the particular policy context comprises a use of the computing environment by a particular set of users.

11. The computing system of claim 10, wherein the method further includes:

generating a plurality of different endorsement records for uses of the computing environment in the particular policy context for different sets of users.

12. The computing system of claim 3, wherein the determined level of trust and conformity comprises a label reflecting an endorsement tier selected from a plurality of different labels associated with correspondingly different endorsement tiers.

13. The computing system of claim 3, wherein the endorsement record comprises a listing of components from the selected set of computing components with a compliance identifier for at least one listed component in the listing of components.

14. The computing system of claim 1, wherein the method further includes:

detecting a change in a computing component utilized in the computing environment;

in response to the detected change, determining whether to generate a new ledger;

generating a new ledger with new evidence, including a new electronic record for a computing component that has been detected as being changed; and generating a new ledger index record that includes an identification of components and evidence associated with the new ledger and that associates the strong identifier with the new ledger.

15. The computing system of claim 14, wherein the method further includes:

generating an updated endorsement record corresponding to the identified use of the computing environment in the particular context based on electronic records of evidence in the new ledger, including the new electronic record for the computing component that has been detected as being changed, the updated endorsement record identifying a new level of confidence of the electronic records of evidence in the new ledger for the identified use of the computing environment in the particular context with the computing component that has been detected as being changed.

16. A computing system comprising:

one or more hardware processors; and one or more storage device having stored computer-executable instructions which are executable by the one or more hardware processors for causing the computing system to implement a method for deterministically managing execution of actions based on assessed risks associated with different computing environments and policies, wherein the method comprises the computing system:

identifying a request to perform an action in a particular computing environment;

identifying a policy associated with performing the action in the computing environment;

identifying hardware and software components of the computing environment that are associated with performing the action;

identifying a ledger record that includes electronic records of evidence associated with levels of trust for the identified hardware and software components of the computing environment;

verifying the electronic records of evidence have not been modified;

identifying, based on the electronic records of evidence, a level of confidence of the electronic records of evidence for using the particular computing environment to perform the action; and deterministically performing the action or, alternatively, refraining from performing the action based on a determination of whether the identified level of confidence of the electronic records of evidence satisfies a requirement of the policy associated with performing the action in a particular context corresponding to the particular computing environment.

17. The computing system of claim 16, wherein the request to perform an action comprises a request to instantiate or link a new component to the particular computing environment.

18. The computing system of claim 17, wherein the identifying of the ledger record further includes identifying a ledger record that includes an electronic record of evidence associated with the new component.

19. The computing system of claim 18, wherein the method further includes deterministically refraining from performing the action in response to determining that the identified level of confidence of the electronic records of evidence fails to satisfy the requirement of the policy associated with performing the action in the particular context corresponding to the particular computing environment.

20. The computing system of claim 19, wherein the method further includes generating a notification of a reason for refraining from performing the action and that also identifies a change to be made to the computing environment that will enable the performance of the action.

* * * * *